W. BARK.
DRAWBENCH.
APPLICATION FILED NOV. 26, 1920.
1,411,655.
Patented Apr. 4, 1922.
3 SHEETS—SHEET 1.
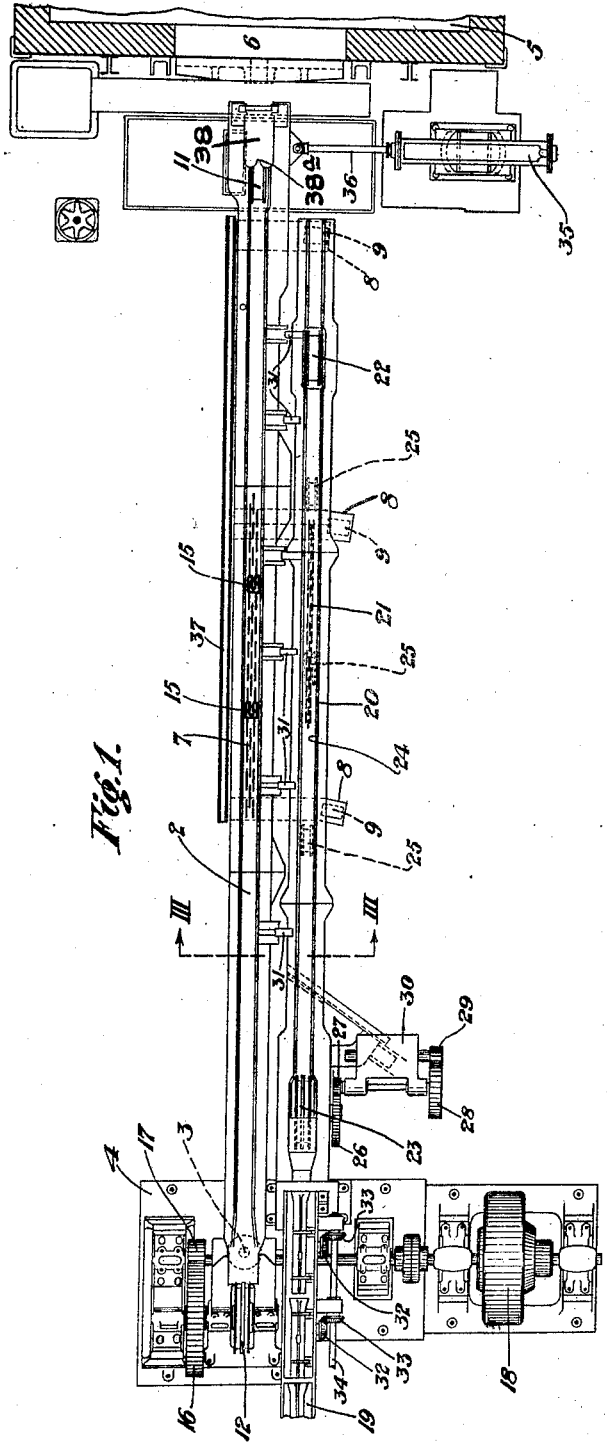
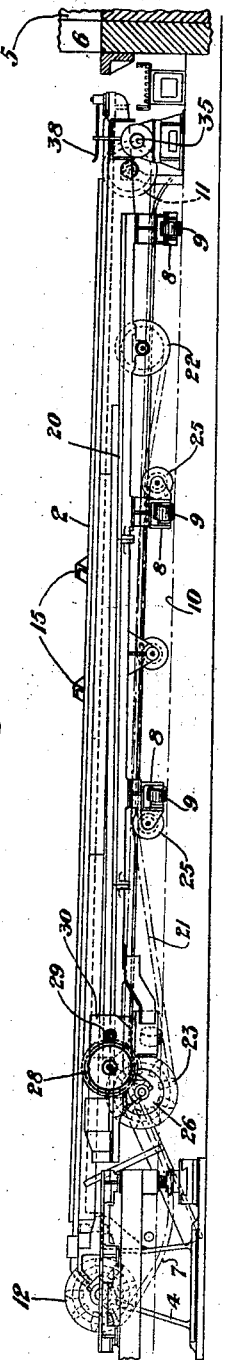
INVENTOR
William Bark
by D. Anthony Usina
Attorney

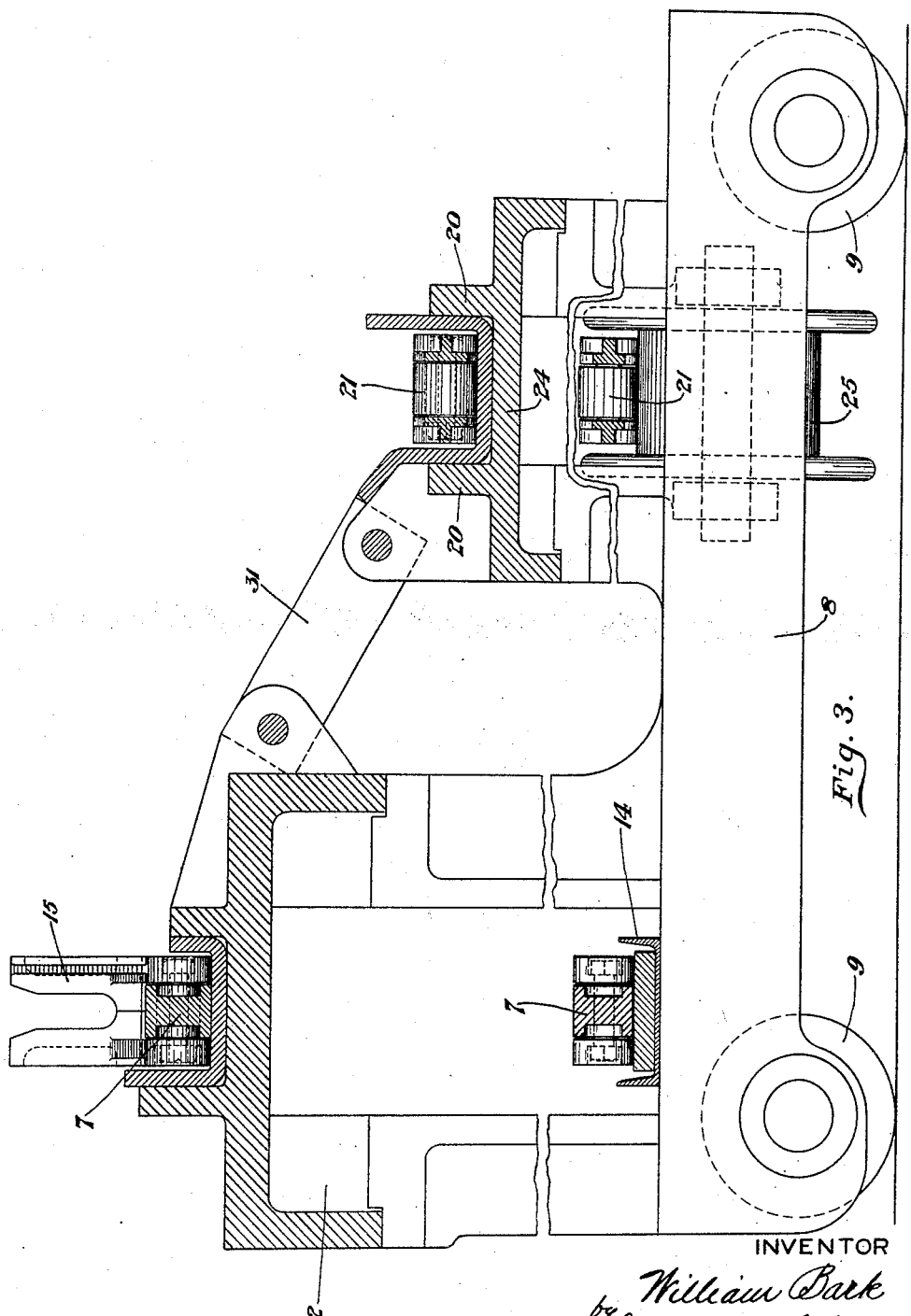

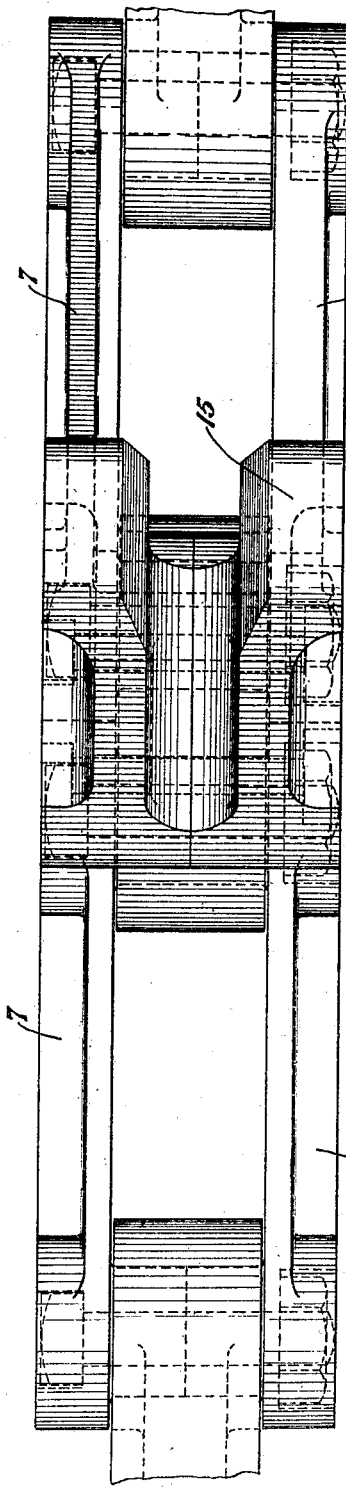
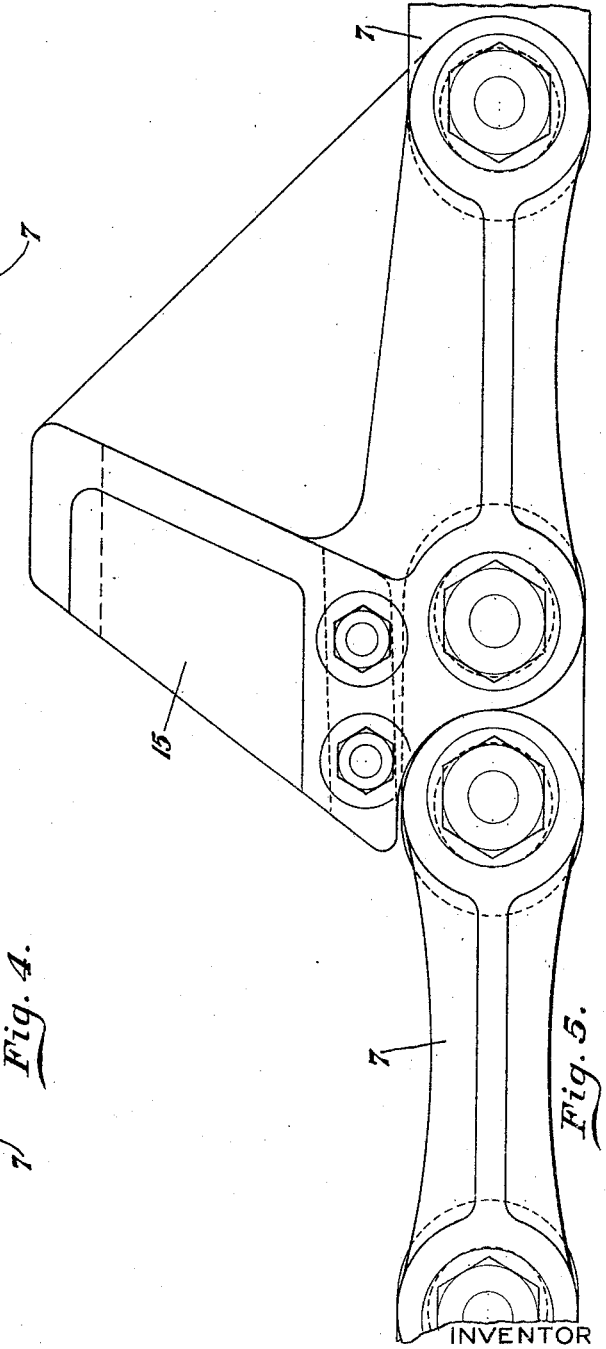

UNITED STATES PATENT OFFICE.

WILLIAM BARK, OF ELYRIA, OHIO, ASSIGNOR TO NATIONAL TUBE COMPANY, OF PITTSBURGH, PENNSYLVANIA, A CORPORATION OF NEW JERSEY.

DRAWBENCH.

1,411,655.  Specification of Letters Patent.  Patented Apr. 4, 1922.

Application filed November 26, 1920. Serial No. 426,494.

*To all whom it may concern:*

Be it known that I, WILLIAM BARK, a citizen of the United States, and resident of Elyria, in the county of Lorain and State of Ohio, have invented certain new and useful Improvements in Drawbenches, of which the following is a specification.

My invention relates to the construction and operation of the draw benches used in the manufacture of buttweld pipes and tubes, and more particularly to draw benches of the swinging type, in which the rear end of the bench is pivoted and the front or furnace end thereof swings in a horizontal plane across the width of the opening or doorway in the end of the skelp heating furnace through which the heated skelp are withdrawn in the welding operations.

One object of my invention is the provision of a draw bench having novel means for handling and conveying the pipes or tubes after completion of the welding operations, in delivering the welded pipes or tubes endwise to the sizing rolls.

Another object of the invention is to provide a swinging draw bench, having the novel construction, arrangements, and combination of parts shown by the drawings and described in detail hereinafter, and particularly pointed out in the appended claims.

The invention consists in the provision as an integral part of the swinging draw bench, of means for receiving and conveying the welded pipes to the delivery rollers of the feed table leading to the entering side of the pipe mill sizing rolls by which the welded pipes are made truly cylindrical and of uniform diameter.

Referring now to the drawings forming part of this specification, Figure 1 is a plan, showing a swinging draw bench constructed and arranged in accordance with my invention.

Figure 2 is a side elevation of the draw bench shown in Figure 1.

Figure 3 is a sectional end elevation, on a larger scale, showing details in the construction of the draw bench of Figures 1 and 2, the section being taken on the line III—III of Figure 1.

Figure 4 is a plan, showing details in the construction of the draw chain and tongs hooks, forming part of the draw bench of Figures 1, 2, and 3.

Figure 5 is a side elevation of the draw chain and tongs hook illustrated in Figure 4.

In the accompanying drawings, the numeral 2, in a general way, designates a swinging draw bench which is pivoted on and supported at its rear end by the pivot pin 3 on the base or standard 4. The draw bench 2 extends lengthwise in front of a skelp heating furnace 5, and has its front or swinging end positioned adjacent to the doorway or opening 6 in the discharge end of the furnace, through which the heated skelp are pulled by the endless traveling draw chain 7 mounted on the draw bench 2. The draw bench is supported on wheeled trucks 8 located at intervals in its length, the wheels 9 of the truck traveling on tracks on the mill floor 10.

The endless draw chain 7 extends around the idler sprocket wheel 11 on the front or swinging end of the draw bench, and the chain driving sprocket wheel 12 at the rear or pivot end of the draw bench, the top run of the draw chain being supported on the guide-way on the upper face of the draw bench. The lower side of the draw chain is supported by anti-friction rollers, and by the guides 14, so as to always be clear of the mill floor 10. (See Figure 3).

In the apparatus shown, the draw chain is provided at suitable intervals in its length, with two or more forked hooks 15 which automatically engage the button on the end of the tongs by which the pipe skelp are attached to the draw chain in the pipe welding operations.

In another and older form of draw bench, the hooks 15 are omitted, a manually operated hook or "monkey" being employed to connect the tongs to the draw chain in the successive skelp drawing operations.

The sprocket wheel 12 at the pivoted end of the draw bench 2 is driven through reducing gears 16 and 17 by the electric driving motor 18 located alongside and at the receiving end of the roller conveyer table 19 which leads to the pipe or tube sizing rolls.

Also mounted on the wheeled trucks 8 forming the conveyer for the draw bench 2, is a pipe conveyer, designated generally by the numeral 20, forming part of my improved apparatus. As shown, this conveyer has an endless chain 21 which extends around an idler wheel 22 near the furnace end of the draw bench, and a driving sprocket wheel 23 adjacent to the pivoted end thereof. The upper run of this endless conveyer chain 21 travels in the guide-way 24 forming the track or conveyer chain support, and the lower side of the chain is supported at intervals in its length by idler wheels 25 to prevent the chain from dragging on or striking the floor 10 when the draw bench is being operated or is being swung across the width of the discharge opening in the end of the furnace.

The sprocket wheel 23 on one end of the conveyer 20, is connected by reducing gears 26 and 27, 28 and 29 to the armature shaft of an electric driving motor 30, this motor and the reducing gearing being mounted on the side of the conveyer 20 so as to move or swing sidewise with the draw bench.

The upper face of the conveyer chain 21 is at a lower level than the upper face of the draw chain 7, and the series of inclined ways 31 on which the welded pipes roll from the chain 7 to the conveyer chain 21, tie the conveyor 20 to the draw bench 2. (See Figure 3).

The conveyer 20 is arranged to deliver the welded pipe endwise to the end of the roller conveyer table 19 on which the welded pipes are transferred to the sizing rolls (not shown) by which these pipes are sized and made truly cylindrical. The rollers of this table 19 are positively driven through bevel gears 32 and 33 by the line shaft 34.

The front end of the draw bench is moved across the width of the doorway in the end of the skelp heating furnace, in the usual known manner, by a fluid pressure cylinder 35, the outer end of its piston rod 36 being pivotally connected to one side of the draw bench, as is shown in Figure 1. The supply of fluid pressure to the cylinder 35 is regulated and controlled by a manually operated valve, not shown, which is located in any suitable position.

The draw bench 2 is provided on the welder's side thereof, with the usual trough 37 in which the tongs are returned from the pivoted end of the bench into position to be grasped and again used by the welder.

A metal plate or arm 38 is mounted on the front end of the draw bench and has its free end upturned and provided with a notch 38ª forming a guide for the tongs, thus insuring that the button end of the tongs will lie central with the draw chain 7 and therefore be caught by the hooks 15 of the chain.

In the operation of my improved draw bench, the welder connects a pair of pipe tongs to the end of a heated skelp lying within the furnaces, and after threading a welding bell over the tongs, into position behind the stop on the draw bench, then positions the reins of the tongs immediately above the traveling draw chain 7 at the furnace end of the draw bench. As the forked tongs hook on the traveling draw chain passes around the idler sprocket wheel 11 to the upper side of the draw bench, its tines automatically engage with the button on the end of the tongs reins, and pulls the tongs and the heated skelp attached thereto through the welding bell on the front or furnace end of the draw bench 2. After the welded skelp is pulled entirely through the welding die and is thereby formed into a welded pipe, the tongs are first disengaged from the tongs hook on the draw chain, and then disengaged from the welded pipe, which is now lying on the upper face of the draw bench 2. After the tongs are disengaged from the front or first welded end of the welded pipe, the pipe is skidded or rolled down the inclined ways 31 upon the traveling conveyer chain 21. This chain, no matter what the position of the front or swinging end of the draw bench, will then deliver the welded pipe endwise to the roller table 19 by which the pipe is then transferred to the pipe mill sizing rolls.

The above described operations are then repeated in making the successively welded pipes.

The advantages of my invention, which will be apparent to those skilled in the art, arise from the combination with the swinging draw bench, of means forming a pipe conveyer which moves with the draw bench and receives the welded pipes, and which, in any of the angular positions into which the pivoted draw bench is moved during the successive pipe welding operations, delivers the pipes endwise as received from the draw bench to the fixed roller table by which the pipes are transferred to the sizing rolls. The apparatus is simple and very compact, and is arranged to handle the pipe without delays, so that the welding operations are facilitated.

Many modifications in the construction and arrangement of the apparatus may be made without departing from the spirit of my invention as defined in the appended claims.

I claim:—

1. A draw bench for making buttweld pipes or tubes, comprising a pivoted horizontally swinging carriage having a traveling draw chain thereon for drawing heated skelp from a heating furnace through a welding bell, an endless, positively driven conveyer chain on said carriage below and paralleling said draw chain for conveying the welded pipe lengthwise away from said draw chain, inclined ways extending between said draw chain and conveyer chain on which the welded pipes or tubes are transferred sidewise by gravity from said draw chain to said conveyer chain, and means mounted on said carriage for driving said conveyer chain.

2. A draw bench for making buttweld pipes or tubes, comprising a pivoted horizontally swinging carriage having a traveling draw chain thereon for drawing heated skelp from a heating furnace through a welded bell, an endless, positively driven conveyer chain on said carriage alongside said draw chain for conveying the welded pipe lengthwise away from said draw chain, said conveyer chain being lower than said draw chain, and means extending between said draw chain and conveyer chain on which the welded pipes and tubes are transferred sidewise by gravity from said draw chain to said conveyer chain.

In testimony whereof, I have hereunto set my hand.

WILLIAM BARK.